United States Patent
Wang et al.

(10) Patent No.: US 7,712,944 B2
(45) Date of Patent: May 11, 2010

(54) LUMINANCE ENHANCEMENT OPTICAL SUBSTRATES WITH ANTI-CHATTER STRUCTURES

(75) Inventors: Kong-Hua Wang, Taipei (TW); Craig Lin, Taipei (TW); Daniel Yaw-Chung Ko, Taipei (TW)

(73) Assignee: Ubright Optronics Corporation, Taipei (TW)

( * ) Notice: Subject to any disclaimer, the term of this patent is extended or adjusted under 35 U.S.C. 154(b) by 109 days.

(21) Appl. No.: 11/635,802

(22) Filed: Dec. 6, 2006

(65) Prior Publication Data
US 2008/0049451 A1 Feb. 28, 2008

Related U.S. Application Data

(60) Provisional application No. 60/742,959, filed on Dec. 6, 2005.

(51) Int. Cl.
*F21V 8/00* (2006.01)
(52) U.S. Cl. .................. 362/620; 362/339; 362/626
(58) Field of Classification Search .......... 362/620, 362/619, 606, 607, 608, 625, 626, 650, 651, 362/97.1, 330, 331, 333, 337, 339, 244, 246
See application file for complete search history.

(56) References Cited

U.S. PATENT DOCUMENTS

| | | | |
|---|---|---|---|
| 4,542,449 A | 9/1985 | Whitehead | |
| 5,005,108 A | 4/1991 | Pristash et al. | |
| 5,175,030 A | 12/1992 | Lu et al. | |
| 5,183,597 A | 2/1993 | Lu | |
| 5,280,371 A | 1/1994 | McCartney, Jr. et al. | |
| 5,579,163 A | 11/1996 | Peterson | |
| 5,771,328 A * | 6/1998 | Wortman et al. | 385/146 |
| 5,779,337 A | 7/1998 | Saito et al. | |
| 5,851,062 A | 12/1998 | Shinohara et al. | |
| 5,917,664 A | 6/1999 | O'Neill et al. | |
| 5,919,551 A | 7/1999 | Cobb, Jr. et al. | |
| 6,091,547 A | 7/2000 | Gardiner et al. | |
| 6,330,386 B1 | 12/2001 | Wagner et al. | |
| 6,354,709 B1 | 3/2002 | Campbell et al. | |
| 6,707,611 B2 | 3/2004 | Gardiner et al. | |
| 6,783,349 B2 | 8/2004 | Neavin et al. | |

(Continued)

FOREIGN PATENT DOCUMENTS

EP 1455203 9/2004

(Continued)

OTHER PUBLICATIONS

International Search Report of Counterpart PCT Application No. PCT/US2006/046689.

(Continued)

*Primary Examiner*—Bao Q Truong
(74) *Attorney, Agent, or Firm*—Liu & Liu

(57) ABSTRACT

An optical substrate possesses a structured surface that enhances luminance or brightness and reduces chatter phenomenon. A structured surface is provided, in which some of the valleys (low valleys) are coplanar to the surface of the underlying support layer and other valleys (high valleys) are not coplanar on the support layer. The low valleys have bottom thickness that is substantially smaller than that of the high valleys. The distance from the valleys to the support layer remains substantially similar for a first number of adjacent valleys, but is substantially zero for a second number of adjacent valleys after every n-th adjacent valleys.

21 Claims, 4 Drawing Sheets

U.S. PATENT DOCUMENTS

| | | |
|---|---|---|
| 6,797,366 B2 | 9/2004 | Hanson et al. |
| 6,808,658 B2 | 10/2004 | Stover |
| 6,827,886 B2 | 12/2004 | Neavin et al. |
| 6,862,141 B2 | 3/2005 | Olczak |
| 7,269,327 B2 * | 9/2007 | Tang ........................... 385/146 |
| 2001/0011779 A1 | 8/2001 | Stover |
| 2001/0013668 A1 | 8/2001 | Neavin et al. |
| 2001/0022982 A1 | 9/2001 | Neavin et al. |
| 2001/0053075 A1 | 12/2001 | Parker et al. |
| 2002/0057497 A1 | 5/2002 | Gardiner et al. |
| 2002/0146296 A1 | 10/2002 | Schmitz et al. |
| 2003/0103760 A1 | 6/2003 | Gardiner et al. |
| 2003/0112521 A1 | 6/2003 | Gardiner et al. |
| 2003/0227768 A1 | 12/2003 | Hara et al. |
| 2004/0061944 A1 | 4/2004 | Kashima et al. |
| 2004/0090572 A1 | 5/2004 | Han et al. |
| 2004/0105157 A1 | 6/2004 | Matsushita et al. |
| 2004/0190102 A1 | 9/2004 | Mullen et al. |
| 2004/0246599 A1 | 12/2004 | Nilsen |
| 2005/0001043 A1 | 1/2005 | Gardiner et al. |
| 2005/0024849 A1 | 2/2005 | Parker et al. |
| 2005/0110175 A1 | 5/2005 | Stover |
| 2005/0122591 A1 | 6/2005 | Parker et al. |
| 2005/0140860 A1 | 6/2005 | Olczak |
| 2005/0141243 A1 | 6/2005 | Mullen et al. |
| 2005/0280752 A1 | 12/2005 | Kim et al. |
| 2006/0047358 A1 | 3/2006 | Liang et al. |

FOREIGN PATENT DOCUMENTS

| | | |
|---|---|---|
| WO | 9936248 | 7/1999 |
| WO | 99/42861 | 8/1999 |
| WO | 2006073033 | 7/2006 |
| WO | 2005026793 | 8/2007 |

OTHER PUBLICATIONS

International Search Report of Related Case PCT Application No. PCT/US2006/022812.

International Search Report of Related Case PCT Application No. PCT/US2007/015364.

* cited by examiner

LUMINANCE ENHANCEMENT OPTICAL SUBSTRATES WITH ANTI-CHATTER STRUCTURES

This application claims the priority of U.S. Provisional Application No. 60/742,959, filed Dec. 6, 2005. This document is fully incorporated by reference as if fully set forth herein.

The publications noted in the disclosure herein are each fully incorporated by reference, as if fully set forth in its entirety herein.

BACKGROUND OF THE INVENTION

1. Field of the Invention

The present invention relates to optical substrates having a structured surface, particularly to optical substrates for brightness enhancement, and more particularly to brightness enhancement substrates for use in flat panel displays having a planar light source.

2. Description of Related Art

Flat panel display technology is commonly used in television displays, computer displays, and handheld electronics (e.g., cellular phones, personal digital assistants (PDAs), etc.). Liquid crystal display (LCD) is a type of flat panel display, which deploys a liquid crystal (LC) module having an array of pixels to render an image. In backlight LCDs, brightness enhancement films use prismatic structures to direct light along the viewing axes (i.e., normal to the display), which enhances the brightness of the light viewed by the user of the display and which allows the system to use less power to create a desired level of on-axis illumination.

Heretofore, brightness enhancement films were provided with parallel prismatic grooves, lenticular lenses or pyramids on the light emitting surface of the films, which change the angle of the film/air interface for light rays exiting the films and cause light incident obliquely at the other surface of the films to be redistributed in a direction more normal to the exit surface of the films. The brightness enhancement films have a light input surface that is smooth, through which light enters from the backlight module.

Heretofore brightness enhancement films are made up of two layers, including a support base layer and a structured layer. FIG. 1 depicts a sectional structure representative of prior art brightness enhancement films. The brightness enhancement film 100 includes a base layer 102 made of polyethylene terephthalate (PET), and a structured layer 104 of prism structures made of acrylic, which function to redirecting light. The adhesion between these two layers is important to the integrity, reliability and performance of the brightness enhancement film 100. The integrity of the adhesion is affected by environmental conditions, such as moisture and heat. For example, when the brightness enhancement film 100 is subject to moisture and high temperature, the structured layer 104 could separate from the base layer 102, which separation between the layer would result in artifacts in the display image, such as undesirable bright lines in the display image.

The structured surface of brightness enhancement film 100 is formed after bonding a layer of materials (e.g., an acrylic layer) to the base layer 102 prior to forming the prism structures in the acrylic layer to form the structured layer 104. The prism structures in the structured layer 104 may be formed using a number of process techniques, including micromachining using hard tools to form master molds or the like for the prism structures. The hard tools may be very small diamond tools mounted on CNC (Computer Numeric Control) machines (e.g. turning, milling and ruling/shaping machines), such as known STS (Slow Tool Servo) and FTS (Fast Tool Servo). U.S. Pat. No. 6,581,286, for instance, discloses one of the applications of the FTS for making grooves on an optical film by using a thread cutting method. The tool is mounted onto the machine, to create longitudinal prisms in a plane. The mold may be used to form the structured layer through hot embossing a substrate, and/or through the addition of an ultraviolet curing or thermal setting materials in which the structures are formed.

As shown in FIG. 1, the bottom of the valleys 106 of the prisms in the structured layer 104 is not at the surface of the base layer, but spaced at a distance d from the contacting surface of the base layer by acrylic material. It has been found that the bottom thickness d plays an important role in maintaining integrity of the adhesion. In the past, the bottom thickness d range between 0.3 to 3 micrometers. In order to obtain the bottom thickness, several parameters must be controlled, e.g., during the curing process to form the structured surface. For example, nip roll pressure, acrylic resin temperature, line speed, etc. are some of the factors to be taken into consideration. However, it is challenging to control a consistent bottom thickness d. Alignment errors could be introduced by the mechanical system used to form the structured surface. For example, dynamic mechanical alignment errors from the master roll and curing machine are on an order comparable or larger than the bottom thickness d. As a result, those factors would introduce some unwanted cosmetic defects such as 'chatter' and/or non-uniformity of the brightness enhancement film. The results in a phenomenon that is easily seen for existing brightness enhancement films, in which repeated dark shades/lines are seen from light from the planar light source transmitted through the brightness enhancement film.

What is needed is an optical substrate that provides a surface structure that both enhances brightness and reduces chatter phenomenon.

SUMMARY OF THE INVENTION

The present invention is directed to an optical substrate that possesses a structured surface that enhances luminance or brightness and reduces chatter phenomenon. In accordance with the present invention, anti-chatter is achieved by providing a structured surface in which the bottoms of some of the valleys of longitudinal prisms are coplanar to the surface of the underlying support or base layer. All the valleys do not lie in the same plane in the inventive structure. In one embodiment, the distance between the valleys to the support layer remains substantially similar for a first number of adjacent valleys, but is substantially zero for a second number of adjacent valleys after every n-th adjacent valleys, wherein the first number and second number of adjacent valleys are non-zero.

In one embodiment of the present invention, the optical substrate is in the form of a film, sheet, plate, and the like, which may be flexible or rigid, having a two or three-dimensionally varying, structured light output surface that comprises a regular and/or irregular prism structure, and a non-structured, smooth, planar, light input surface. The prism structure at the light output surface may be viewed as comprising longitudinal regular and/or irregular prism blocks arranged laterally (side-by-side), defining peaks and valleys.

In one embodiment of the present invention, the light output surface and the light input surface are generally parallel to each other in the overall optical substrate structure (i.e., do not form an overall substrate structure that is generally tapered, concave, or convex). In another embodiment of the present invention, the optical substrate structure may be regular prism structure at the light output surface, which may be viewed as comprising side-by-side or lateral rows of regular prism blocks wherein the peaks or valleys of adjacent rows of prism blocks may be parallel.

BRIEF DESCRIPTION OF THE DRAWINGS

For a fuller understanding of the nature and advantages of the invention, as well as the preferred mode of use, reference should be made to the following detailed description read in conjunction with the accompanying drawings. In the following drawings, like reference numerals designate like or similar parts throughout the drawings.

DETAILED DESCRIPTION OF THE ILLUSTRATED EMBODIMENTS

The present description is of the best presently contemplated mode of carrying out the invention. This invention has been described herein in reference to various embodiments and drawings. This description is made for the purpose of illustrating the general principles of the invention and should not be taken in a limiting sense. It will be appreciated by those skilled in the art that variations and improvements may be accomplished in view of these teachings without deviating from the scope and spirit of the invention. The scope of the invention is best determined by reference to the appended claims.

The present invention is directed to an optical substrate that possesses a structured surface that enhances brightness. In one aspect of the present invention, the optical substrate is in the form of a film, sheet, plate, and the like, which may be flexible or rigid, having a three-dimensionally varying, structured light output surface that comprises a prism structure, and a non-structured, smooth, planar, light input surface. By way of illustration and not limitation, the present invention will be described in connection with an optical substrate for use in an LCD having an LC panel defining a generally rectangular display area in which an image is rendered.

Figure 1:
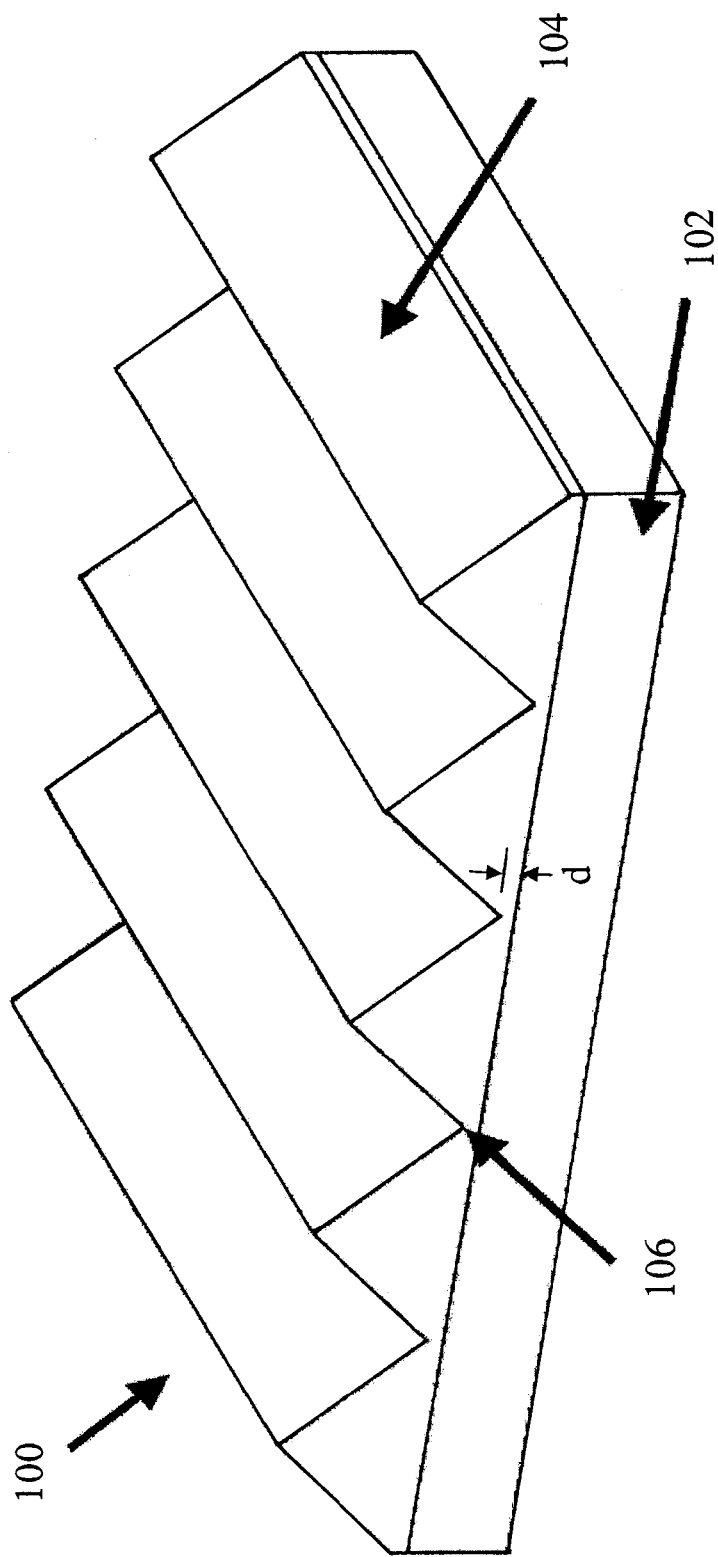
FIG. 1 schematically illustrates a sectional view of a prior art brightness enhancement film.
Figure 2:
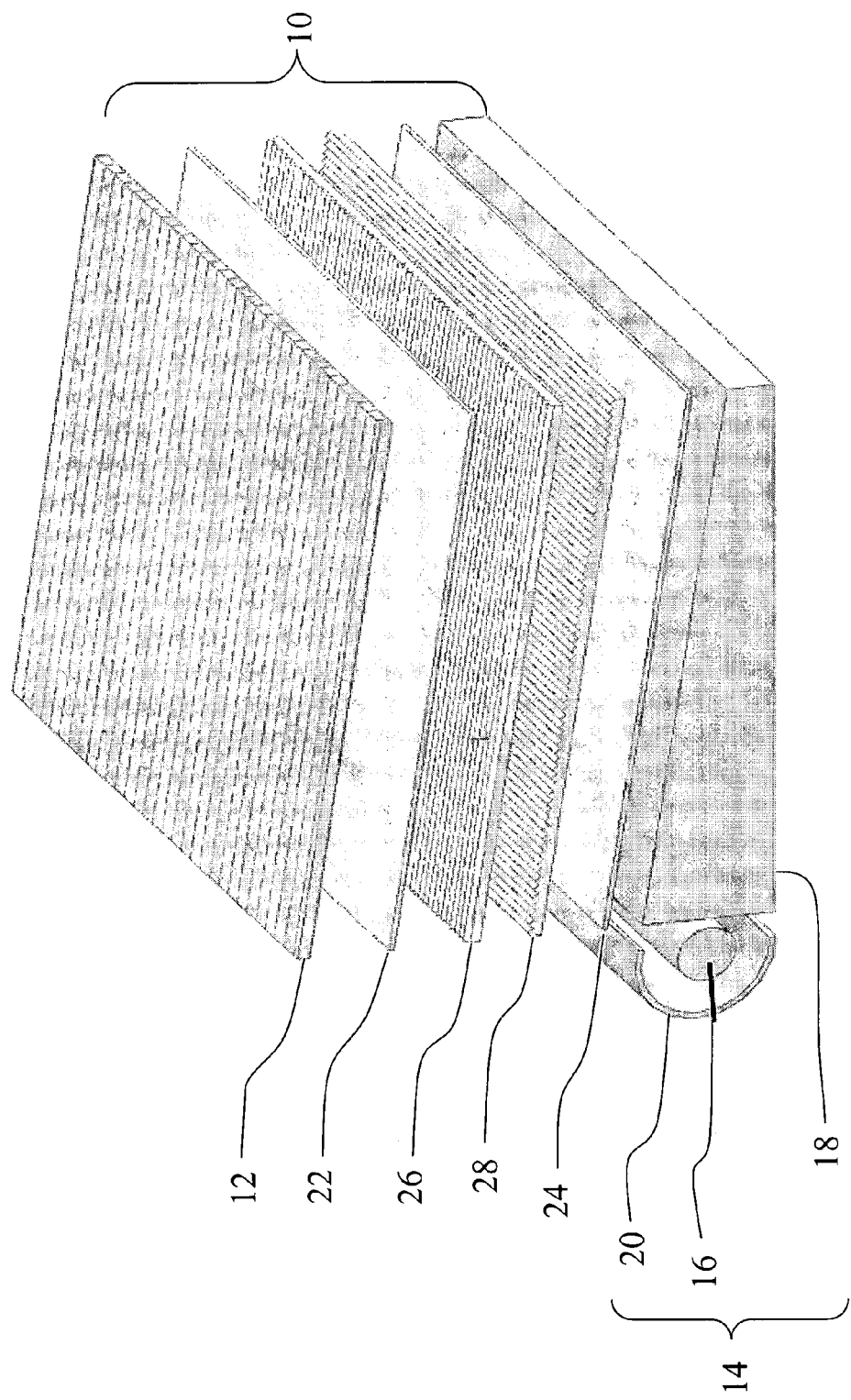
FIG. 2 schematically illustrates the structure of an LCD having an optical substrate, in accordance with one embodiment of the present invention.

FIG. 2 illustrates an example of a flat panel display. A backlight LCD 10, in accordance with one embodiment of the present invention, comprises a liquid crystal (LC) display module 12, a planar light source in the form of a backlight module 14, and a number of optical films interposed between the LC module 12 and the backlight module 14. The LC module 12 comprises liquid crystals sandwiched between two transparent substrates, and control circuitry defining a two-dimensional array of pixels. The backlight module 14 provides planar light distribution, either of the backlit type in which the light source extends over a plane, or of the edge-lit type as shown in FIG. 1, in which a linear light source 16 is provided at an edge of a light guide 18. A reflector 20 is provided to direct light from the linear light source 16 through the edge of the light guide 18 into the light guide 18. The light guide is structured (e.g., with a tapered plate and light reflective and/or scattering surfaces defined on the bottom surface facing away from the LC module 12) to distribute and direct light through the top planar surface facing towards LC module 12. The optical films may include upper and lower diffuser films 22 and 24 that diffuse light from the planar surface of the light guide 18. The optical films further includes a structured surface optical substrate in accordance with the present invention, which redistributes the light passing through such that the distribution of the light exiting the films is directed more along the normal to the surface of the films. In the illustrated embodiment, there are two structured optical substrates 26 and 28 in accordance with the present invention, which are arranged with the longitudinal prism structures generally orthogonal between the two substrates. The optical substrates 26 and 28 are often referred in the art as luminance or brightness enhancement films, light redirecting films, and directional diffusing films. The light entering the LC module 12 through such a combination of optical films is uniform spatially over the planar area of the LC module 12 and has relatively strong normal light intensity. The optical substrates in accordance with the present invention may be used with LCDs to be deployed for displays, for example, for televisions, notebook computers, monitors, portable devices such as cell phones, PDAs and the like, to make the displays brighter.

Figure 3:
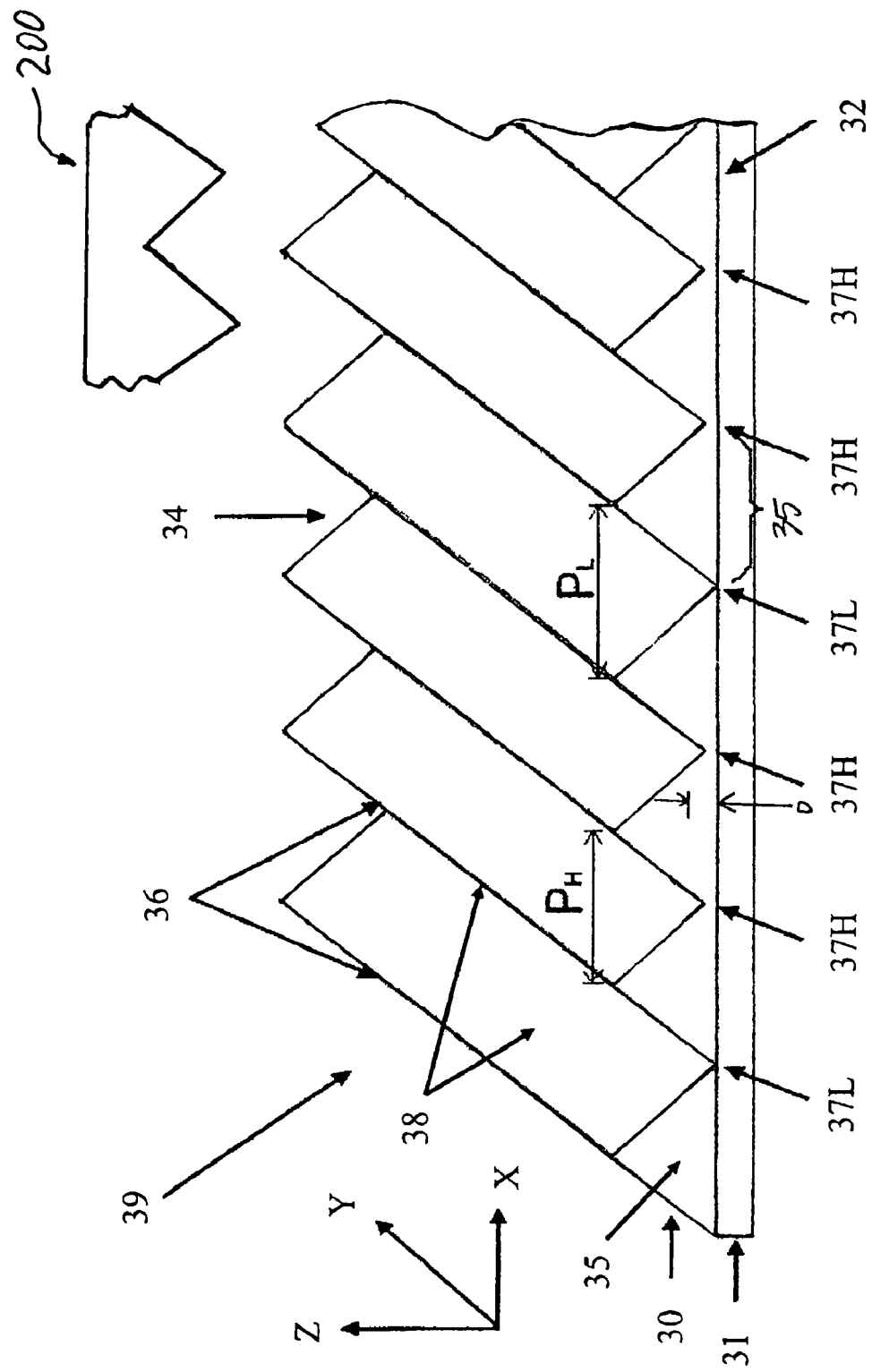
FIG. 3 is a schematic perspective view of the structured light output surface of an optical substrate, in accordance with one embodiment of the present invention.

Refer to FIG. 3, the brightness enhancement film 20 of the present invention includes an optical substrate 30 adhered to a support or base layer 31. The optical substrate has a light input surface 32 that is planar and smooth, and a light output surface 34 that has a prismatic structure that may be viewed as comprising longitudinal regular prism blocks 35 arranged in lateral rows (i.e., side-by-side). In one embodiment of the present invention, the light output surface and the light input surface are generally parallel to each other in the overall optical substrate structure (i.e., do not form an overall substrate structure that is generally tapered like a light guide plate in a backlight module, or that is concave or convex). While FIG. 3 shows the base 31 to be of uniform thickness, it may be non-uniform thickness.

For ease of reference, the following orthogonal x, y, z coordinate system would be adopted in explaining the various directions. As shown in FIG. 3, the x-axis is in the direction across the peaks and valleys, also referred to as the lateral direction. The y-axis is orthogonal to the x-axis, in the plane of the substrate 30, in a generally longitudinal direction of the prism blocks 35. The prism blocks may be regular or irregular (as disclosed in copending U.S. patent application Ser. No. 11/450,145, commonly assigned to the assignee of the present invention, and is fully incorporated by reference herein). In the illustrated embodiment, the prism blocks 35 are regular in geometry. The light input surface 32 lies in an x-y plane. For a rectangular piece of the optical substrate, the x and y-axes would be along the orthogonal edges of the substrate 30. The z-axis is orthogonal to the x and y-axes. The edge showing the ends of the lateral rows of the prism blocks 35 lies in the x-z plane, such as shown in FIG. 3. References to cross sections of a prism block 35 would be sections taken in x-z planes, at various locations along the y axis. Further, references to a horizontal direction would be in an x-y plane, and references to a vertical direction would be in the z-direction. Hereinafter, references to heights of peaks and valleys are measured in the z-direction with respect to the planar surface adjoining between the substrate 30 and the base layer 31. It is noted that the references to peak vertex angles herein refer to the angles of the peak 36, and valley vertex angles herein refer to the angles of the valleys 37, as viewed along cross sections in the x-z planes at locations along the y direction, as defined above.

The prism blocks 35 each has two longitudinal facets, or longitudinal flat surfaces, forming a longitudinal peak 36. The facets 38 of adjoining prism blocks 35 intersect to define a valley 37 (which may be a high valley 37H or a low valley 37L, as will be explained later below). In the illustrated embodiment, the prism blocks 35 are shown to be substantially similar to one another, substantially symmetrical with respect to the z-axis, and have uniform cross-sections along the longitudinal direction (y-axis). The height of the valleys 37 may vary in the lateral (x) direction of the respective valleys 37, as further explained below, and may further vary in the longitudinal (y) direction. The peak vertex angles are similar (e.g., 90 to 100 degrees), and the valley vertex angles are also similar to one another (e.g., 90 to 100 degrees). It is noted that in the sectional views in x-z planes, the peak vertex angles and the valley vertex angles may be rounded instead of a sharp point, due to manufacturing constraints.

In accordance with the present invention, the bottom thickness of the material below the valleys 37 in the optical substrate 30, which defines the height of the valleys above the top surface of the base layer 31, varies across the lateral direction, from substantially zero thickness, to a defined thickness D (e.g., 0.3 to 5 micrometers). In the illustrated embodiment, the heights, or bottom thickness, of the valleys 37 vary periodically, in which the bottom thickness is D (i.e., the "high" valleys 37H) for all the valleys except for every n-th valleys (e.g., every third valleys in FIG. 3), which is substantially smaller thickness or substantially zero thickness (i.e., the "low" valleys 37L). During the forming of the structured surface of the optical substrate, if the nip roll pressure is high enough, the master mold drum may directly touch the base layer 31 at the low valleys 37L, in which case the bottom thickness would be theoretically zero for the low valleys 37L. In any event, bottom thickness of the low valleys 37L is substantially smaller than the bottom thickness of the high valleys 37H. In one embodiment, the ratio of the bottom thickness of the high valley 37H to the bottom thickness of the low valley 37L is more than about 100:1, or more than about 50:1; or more than about 40:1; or about 30:1; or more than about 30:1, or more than about 10:1. Alternatively, instead of the bottom thickness varying across the substrate in a periodic manner, the bottom thickness may vary randomly, between low valleys and high valleys, wherein the low valleys have bottom thickness that are substantially smaller than the bottom thickness of the high valleys. It is understood that the high valleys may have different bottom thicknesses among the high valleys 37H, but which are all substantially thicker than the bottom thickness of the low valleys 37L.

It is noted that for substantially symmetrical peaks 36, the distance or pitch $P_H$ between adjacent peaks 36 about a low valley is a little shorter than the pitch $P_L$ between adjacent peaks 36 about a high valley. In the illustrated embodiment in FIG. 3, the peaks 36 are mutually parallel, and the valleys 37 are mutually parallel, and further the valleys 37 and the peaks 36 are mutually parallel.

As an example to illustrate the relative dimensions of an optical substrate in accordance with the present invention, the peak heights are on the order of 10 to 200 micrometers, the valley heights (bottom thickness) are on the order of 0.3 to 5 micrometers, the width of each peak (as measured between two valleys) are on the order of 20 to 400 micrometers, the thickness of the base layer 31 is on the order of 25 to 300 micrometers. The foregoing dimensions are intended to illustrate the fact that the structured surface features are micro-structures, in the micrometers range. By way of example, the overall size of the area of the optical substrate may vary on the order of 2 mm to 10 m in width and length (and even larger dimensions possible), depending on the particular application (e.g., in a flat panel display of a cellular phone, or in a significantly larger flat panel display of a TV monitor). The characteristic size of the prism blocks on the structured surface of the optical substrate need not change appreciably with different overall optical substrate size.

The optical substrate 30 may be formed with an optically transparent material, such as acrylic. The base substrate 31 may be of PET material, but may be made from the same transparent material as the optical substrate 30, which provides additional structural support to the relatively thin optical substrate 30. The optical substrate 30 may be flexible enough to be manufactured in a roll, which is laid on and bonded to the separate base substrate 31. While the thickness of the base substrate may be on the order of 25 to 300 micrometers thick, the thickness of the base substrate may be thinner or thicker than this range, depending on the particular application. Generally, though not required, larger size optical substrate may have a thicker base substrate to provide better support, and a smaller size optical substrate may require a thinner base substrate for smaller scale applications.

The anti-chatter structure of the structured optical substrate 30 may be formed by prior art processes for forming microstructures on optical substrates, which are configured to provide the varying valley bottom thicknesses in accordance with the present invention. For example, the structured surface of optical substrate of the present invention may be generated in accordance with a number of process techniques, including micromachining using hard tools to form molds or the like for the prismatic profile described above. The hard tools may be very small diamond tools mounted on CNC (Computer Numeric Control) machines (e.g. turning, milling and ruling/shaping machines). Furthermore, known STS (Slow Tool Servo) and FTS (Fast Tool Servo) are examples of the devices. U.S. Pat. No. 6,581,286, for instance, discloses one of the applications of the FTS for making grooves on an optical film by using thread cutting method. The tool is mounted onto the machine, to create constant peak vertex angle in relation to x-z planes along the y direction within a prism.

The master may be used to mold the optical substrate directly or used in electroforming a duplicate of the master, which duplicate is used to mold the optical substrate. The mold may be in the form of a belt, a drum, a plate, or a cavity. The mold may be used to form the prismatic structure on a substrate through hot embossing of the substrate, and/or through the addition of an ultraviolet curing or thermal setting materials in which the structures are formed. The substrate or coating material may be any organic, inorganic or hybrid optically transparent material and may include suspended diffusion, birefringent or index of refraction modifying particles.

It has been found that the anti-chatter structure disclosed above reduces chatter induced shades and/or lines in the displayed image, without compromising adhesion between the structured optical substrate layer 30 and the base layer 31. The structured light output surface is formed by applying a tool to form the peaks and valleys, and wherein the tool is cause to bottom out at the low valleys to press on the support layer (the tool 200 is schematically represented in FIG. 3). The bottom thickness can be relatively easy to control for the high valleys (e.g., 0.3 to 5 micrometers), by applying the nip pressure to cause the master mold drum to substantially bottom out at the low valleys to touch or press upon the harder base layer 31, thereby limiting travel of the mold drum to limit the bottom thickness of the high valleys. Further the curing process involved in the prism structure forming processes is broader for the inventive structured substrate, because the nip roll pressure does not have to be as precisely controlled (as long as the nip pressure is beyond a threshold needed to cause the master mold drum to bottom out on the base layer 31 at the low valleys), as compared to prior art structured substrates. After the layer of material (e.g., acrylic) to be used to form the structured substrate 30 is adhered to the base layer 31, and then the prism structure is formed, the process needs to provide enough pressure to create valleys with substantially zero bottom thickness (i.e., the "low" valleys), or valleys with bottom coplanar with the top surface of the base layer 31. Such low valleys essentially bottoms out at the surface of the base layer 31.

The adhesion control can be adjusted by the ratio of the number of high valleys and low valleys. For example, a design with improved adhesive may have one low valley for every adjacent six high valleys (e.g., each 2 micrometers bottom thickness). If adhesion is acceptable, there may be 4 adjacent low valleys for every six or seven adjacent high valleys.

Further, the following variations are well within the scope and spirit of the present invention. The peak and valley vertex angles may or may not vary across laterally adjoining rows. It is noted that the geometries (e.g., overall size, peak and valley angles, etc.) may be different for different prism blocks 35 in the optical substrate 30. The pitch between adjacent peaks 36, adjacent valleys 37, and/or adjacent peak 36 and valley 37 may vary in an orderly, semi-orderly, random, or quasi-random manner. It is noted that an array, pattern or configuration of a group of random irregular prism blocks may repeat over a range of area or length over the overall structured light output surface of the optical substrate 30, resulting in an overall orderly, semi-orderly or quasi-random pattern or arrangement for the overall optical substrate. Adjacent peaks, adjacent valleys, and/or adjacent peak and valley may or may not be parallel within at least a range of lateral prism blocks. The adjacent peaks 36, adjacent valleys 37, and/or adjacent peak 36 and valley 37 may alternate from parallel to non-parallel, in an orderly, semi-orderly, random, or quasi-random manner. Similarly, adjacent non-parallel peaks 36, adjacent valleys 37 and/or adjacent peak 36 and valley 37, may alternate between convergence to divergence (in reference to the same general longitudinal direction of the prism blocks), in an orderly, semi-orderly, random, or pseudo-random manner. Sections of the optical substrate 30 taken across the peaks 36 and valleys 37 in an x-z plane at various locations along the y-direction and/or in a general longitudinal direction of a particular peak or valley may or may not be constant.

Figure 4:
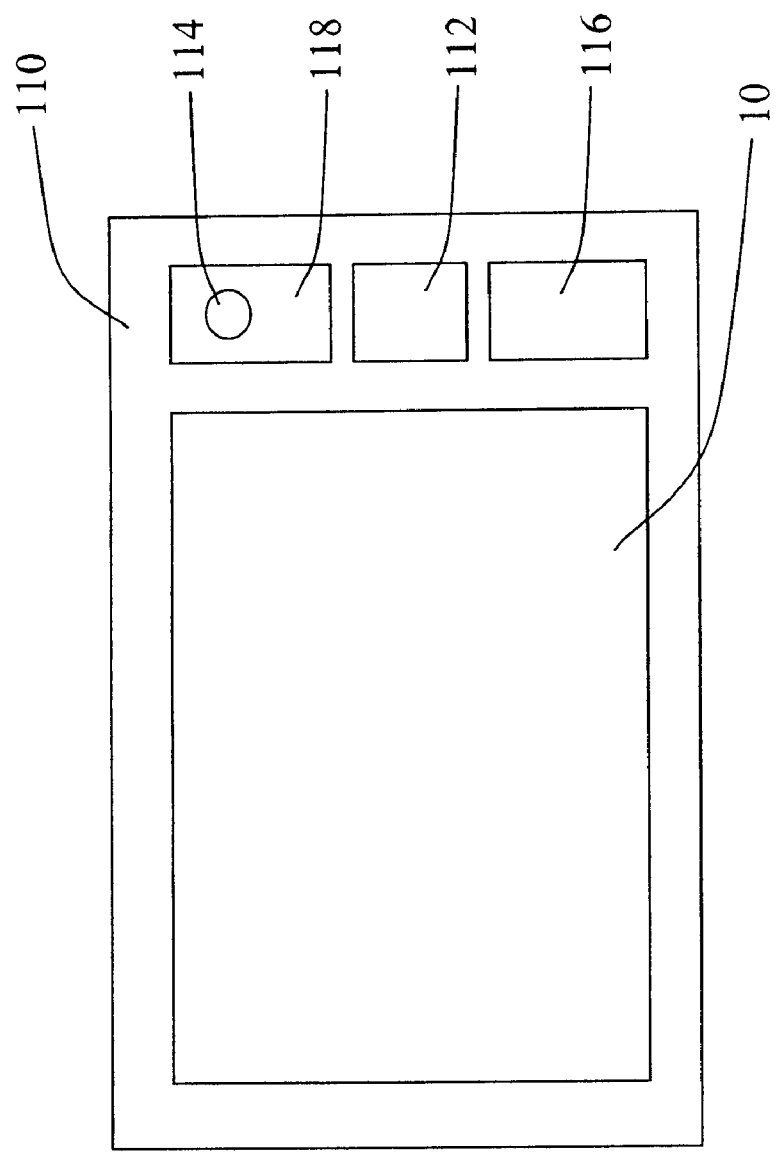
FIG. 4 is a schematic view of an electronic device comprising an LCD panel that incorporates the inventive optical substrate of the present invention, in accordance with one embodiment of the present invention.

In accordance with the present invention, the optical substrate comprising a prismatic, structured light output surface, which enhances brightness and reduces chatter phenomenon, when applied in an LCD for example. An LCD incorporating the inventive optical substrate in accordance with the present invention may be deployed in an electronic device. As shown in FIG. 4, an electronic 110 (which may be one of a PDA, mobile phone, television, display monitor, portable computer, refrigerator, etc.) comprises the inventive LCD 10 (FIG. 2) in accordance with one embodiment of the present invention. The LCD 10 comprises the inventive optical substrate described above. The electronic device 110 may further include within a suitable housing, a user input interface such as keys and buttons (schematically represented by the block 116), image data control electronics, such as a controller (schematically represented by block 112) for managing image data flow to the LCD panel 10, electronics specific to the electronic device 110, which may include a processor, A/D converters, memory devices, data storage devices, etc. (schematically collectively represented by block 118), and a power source such as a power supply, battery or jack for external power source (schematically represented by block 114), which components are well known in the art.

While particular embodiments of the invention have been described herein for the purpose of illustrating the invention and not for the purpose of limiting the same, it will be appreciated by those of ordinary skill in the art that numerous variations of the details, materials, and arrangements of parts may be made without departing from the scope of the invention as defined in the appended claims.

The invention claimed is:

1. A luminance enhancement substrate, comprising:
a support layer having a top surface; and
an optical substrate, having a planar light input surface at one side of the optical substrate, and a structured light output surface at an opposite side of the optical substrate defining a plurality of peaks and valleys defined by longitudinal prisms in the structured light output surface, wherein the light input surface is adhered to the top surface of the support layer, and wherein the distance of the plurality of valleys from the top surface varies across the optical substrate.

2. The luminance enhancement substrate as in claim 1, wherein the distance varies in a periodical manner for the valleys across the structured surface.

3. The luminance enhancement substrate as in claim 2, wherein the distance remains substantially similar for a first number of adjacent valleys, but is substantially zero over a longitudinal distance for a second number of adjacent valleys in their entirety after every first number of adjacent valleys, wherein the first number and second number of adjacent valleys are non-zero.

4. The luminance enhancement substrate as in claim 1, wherein the peaks have same height across entire substrate.

5. The luminance enhancement substrate as in claim 1, wherein the prisms are similar across the structured light output surface.

6. The luminance enhancement substrate as in claim 1, wherein the prisms are regular prisms.

7. The luminance enhancement substrate as in claim 1, wherein the prisms are each symmetrical about a longitudinal direction.

8. The luminance enhancement substrate as in claim 1, wherein some of the valleys are substantially coplanar with the top surface of the support layer, and other valleys are not coplanar with said coplanar valleys.

9. The luminance enhancement substrate as in claim 8, wherein said coplanar valleys are spaced in a periodic manner across the valleys in the structured surface.

10. A luminance enhancement substrate, comprising:
a support layer having a top surface; and
an optical substrate, having a planar light input surface at one side of the optical substrate, and a structured light output surface at an opposite side of the optical substrate defining a plurality of peaks and valleys, wherein the light input surface is adhered to the top surface of the support layer, and wherein the distance of the plurality of valleys from the top surface varies across the optical substrate,
wherein some of the valleys are substantially coplanar with the top surface of the support layer, and other valleys are not coplanar with said coplanar valleys, wherein said coplanar valleys are spaced in a periodic manner across the valleys in the structured surface, and wherein said coplanar valleys are spaced after every first number of adjacent valleys, wherein the first number of adjacent valleys is non-zero.

11. The luminance enhancement substrate as in claim 10, wherein said coplanar valleys comprise a second number of adjacent coplanar valleys after every first number of adjacent valleys, wherein the second number is non-zero.

12. The luminance enhancement substrate as in claim 1, wherein the distance for a first number of adjacent valleys is substantially larger than the distance for a second number of adjacent valleys, wherein the first number and the second number of adjacent valleys are non-zero.

13. A flat panel display, comprising:
a display module emitting light in accordance with an image; and
an optical substrate as in claim 1, enhancing brightness of the image.

14. An electronic device, comprising:
a flat panel display as in claim 13; and
control electronics directing image data to the flat panel display to render an image in accordance with the image data.

15. A method of enhancing brightness of an image rendered by a flat panel display, comprising:
providing a display module that emits light in accordance with an image; and
providing an optical substrate as in claim 1, receiving light through the light input surface and emitting light through the light output surface, whereby brightness of the image is enhanced by the structured surface.

16. A method of making a luminance enhancement substrate, comprising:
providing a support layer having a top surface;
adhering a light input surface on one side of an optical substrate layer on the top surface;
forming a structured light output surface comprising longitudinal prisms at an opposite side of the optical substrate to define a plurality of peaks and valleys, wherein the distance of the plurality of valleys from the top surface varies across the optical substrate.

17. The method as in claim 16, wherein the distance remains substantially similar for a first number of adjacent valleys, but is substantially zero over a longitudinal distance for a second number of adjacent valleys in their entirety after every first number of adjacent valleys, wherein the first number and second number of adjacent valleys are non-zero.

18. The method as in claim 16, wherein some of the valleys are substantially coplanar with the top surface of the support layer, and other valleys are not coplanar with said coplanar valleys.

19. The method as in claim 16, wherein the distance for a first number of adjacent high valleys is substantially larger than the distance for a second number of adjacent low valleys, wherein the first number and the second number of adjacent valleys are non-zero.

20. The method as in claim 19, wherein the structured light output surface is formed by applying a tool to form the peaks and valleys, and wherein the tool is cause to bottom out over a longitudinal distance at the low valleys in their entirety to press on the support layer.

21. The luminance enhancement substrate as in claim 1, wherein the optical substrate has a first edge and a second edge, wherein each longitudinal prism extends from the first edge to the second edge.

* * * * *